United States Patent [19]
Cifaldi

[11] Patent Number: 5,703,636
[45] Date of Patent: Dec. 30, 1997

[54] HIGH RESOLUTION OPTICAL COMMUNICATION SYSTEM

[76] Inventor: Carmine Cifaldi, 360 Union Ave., Patterson, N.J. 07505

[21] Appl. No.: 645,742

[22] Filed: May 14, 1996

[51] Int. Cl.$^6$ .......................... H04M 11/00; H04B 9/00; H04N 7/12

[52] U.S. Cl. ............................. 348/14; 379/90; 379/96; 358/901.01; 359/113; 385/116; 455/6.3

[58] Field of Search .................. 348/14–20; 379/90, 379/93–100, 110; 358/901.01; 359/109, 113, 118, 173; 385/116; 315/3; 455/5.1, 6.3

[56] References Cited

U.S. PATENT DOCUMENTS

| | | |
|---|---|---|
| D. 305,230 | 12/1989 | Math . |
| 4,015,115 | 3/1977 | Corcoran ................................. 379/100 |
| 4,530,084 | 7/1985 | Strebel et al. ........................... 348/14 |
| 5,191,601 | 3/1993 | Ida et al. . |
| 5,204,893 | 4/1993 | Choi et al. . |
| 5,350,978 | 9/1994 | Chen . |
| 5,371,534 | 12/1994 | Dagdeviren et al. . |

*Primary Examiner*—Wing F. Chan
*Attorney, Agent, or Firm*—Terrance L. Siemens

[57] ABSTRACT

A communications system linking video phones located at diverse premises by a network of optical fiber cables. Each premises has a telephone, television screen, and television camera. Audio and video output signals are converted to optical signals, which signals are carried over the optical fiber network to another premises. Each premises has apparatus for converting optical signals to a form suitable for driving the speaker of the telephone and the CRT of the television. Extremely high resolution is achieved by limiting the G1 aperture of the television cathode to 0.010 inch, thereby enabling the CRT to scan at least 2,000 lines. A centrally located master computer is disposed serially between any two premises, and generates signals for controlling horizontal and vertical yoke, and the electron gun. These signals are optically transmitted concurrently with the audio and video input signals. The system may also incorporate other inputs from the premises, such as utility meters. It will also process external inputs, such as television broadcast services whether produced from RF coaxial, microwave or other visual information suppliers.

11 Claims, 3 Drawing Sheets

HIGH RESOLUTION OPTICAL COMMUNICATION SYSTEM

BACKGROUND OF THE INVENTION

1. Field of the Invention

The present invention relates to a communication system for communicating between remote locations. Any number of locations may be linked one-to-one by the novel system. Each location has both audio and video devices, preferably taking the form of a telephone and a cathode ray tube (CRT) screen for viewing the other person, and a television type camera for enabling the other party to view the first party. Each location has, in addition to telephone, television camera and CRT viewing screen, apparatus for generating, receiving and processing optical signals, and for producing audio and video outputs responsive to these signals.

An audio signal and a video signal are transmitted between any two persons communicating with one another by optical signals transmitted through the novel communications system. These signals originate at the telephone and a television type camera which one party employs for speaking and for allowing the other party to view the speaker. A master computer, provided at a central location, also generates control signals to each communicating location for controlling the horizontal yoke, vertical yoke, and electron beam of the gun in the tube of the T.V. set, in synchronization with the T.V. camera which forms the original current real time image, while also recording the audio being developed in addition to the separate adjoining telephone sending and receiving device.

2. Description of the Prior Art

Combined audio and video personal communications systems have long been desired. Such systems are known as video phones, and are currently capable of transmitting audio and video signals over the national telephone system. Examples are seen in U.S. Pat. Nos. 5,204,893, issued to Hyun J. Choi et al. on Apr. 20, 1993, and 5,371,534, issued to Nuri R. Dagdeviren et al. on Dec. 6, 1994. These systems employ standard telephone transmission systems, and lack optical signals and controls therefor of the present invention. Also, because these prior art systems are subject to limitations of over-the-air bandwidths, extremely high resolution achieved in the present invention is absent in all other systems world-wide.

In U.S. Pat. No. 5,191,601, issued to Takashi Ida et al. on Mar. 2, 1993, there is described a video phone unit, or a combined telephone, television type camera, and television type screen. This unit is one embodiment of a significant component required at the premises of each individual user of a video phone system. The unit of Ida et al. employs conventional telephone communications, and is thus also subject to the limitations set forth above.

While optical signals have been employed in telephonic transmission, they have not been exploited to achieve high resolution. The audiovisual industry continues to struggle with the problem of mass distributed signals suitable for high resolution or high definition video images.

A prior art multi-beam electron beam gun for a color cathode ray tube (CRT) is shown in U.S. Pat. No. 5,350,978, issued to Hsing-Yao Chen on Sep. 27, 1994. This device is representative of electron guns, and serves as background for explaining a modification to electron guns employed in the present invention.

None of the above inventions and patents, taken either singly or in combination, is seen to describe the instant invention as claimed.

SUMMARY OF THE INVENTION

The present invention provides a communications system which enables video phones among other uses to be both practical and also characterized by high resolution images. The novel system employs optical signals which are transmitted to each user premises. A master computer distributes concurrent control signals enabling the system to operate properly.

The novel system overcomes limitations of conventional communications which rely upon radio frequency bandwidths dictated by the authorities, thereby enabling high resolution video images to be provided by generally conventional technology. The system provides high resolution video performance due to exploiting signal frequencies available to optic fiber networks, in combination with specially modified electron beam guns provided for each associated CRT screen.

The present system optically transmits digital signals. Current technology enables these signals to be compatible with analog signals. Signals transmitted over an optical network are not subject to bandwidth limitations imposed by the authorities. Therefore, throughput of data is greatly magnified in an optical system.

Increased data throughput is exploited by provision of a 2,500 line array in the CRT. This compares quite favorably with current practice, which is 525 lines in the U.S. and 600 lines in Europe, and even with a proposed standard of 1,000 lines for high definition television. The G1 grid of electron guns for each color in the receiving CRT are modified to accommodate the improved resolution.

Additional advantages accrue from the novel arrangement. One advantage is that the conventional system of interlaced scanning, as practiced in today's television sets, is abolished, and complicated control schemes for achieving interlaced scanning may be replaced. Another advantage is that control schemes for achieving convergence of red, blue, and green electron guns will also be simplified.

Success in handling this amount of video data lies in control provided by the master computer. Necessary control signals corresponding to horizontal and vertical yoke control and electron gun control are generated by the master computer. These control signals are optically transmitted to each user premises. Each user premises has apparatus for decoding and utilizing these control signals, concurrently with processing audio and video input signals.

The apparatus at each user premises includes an encoder which converts video input signals from a television type camera and audio input signals from the telephone to digital signals. A light signal generator then generates corresponding bursts of optical signals in binary code. These signals pass through an optical fiber network to a receiving party. The master computer is interposed to supply control signals coordinating the input signals to the receiving party.

The receiving party has a decoder which generates corresponding analog signals to a CRT screen and to the telephone. Two remotely located communicating parties are thus able to both view and hear the other party.

A basic communication practice and basic construction features are now described. However, the system may be expanded in both functions and in transmission features. Transmission may, where desirable, convert to radio frequency signals, thereby employing radio links to overcome difficulties which may render continuous optic fiber lines impractical.

With regard to communication functions, each user premises may be served by more than merely videophone facilities. Illustratively, utility meters and cable television service may be managed or overseen by the novel communications system. For example, meters may be read and billing statements may be prepared responsive to communication through the novel system. Quantitative parameters of utility consumption may be monitored to generate an alarm.

Another feature is receiving and monitoring of cost related services, such as cable television. Since television operation is linked to the master computer, unauthorized use of cable television and related services may be monitored and discouraged.

It is preferred that a single interface member be provided for connecting components within a premises to the optical cable network. This feature enables ready connection of any ancillary functions to the optical network.

A security feature for defeating unauthorized use by others of the videophone incorporates an origination identity to outgoing and incoming communications to prevent unauthorized use of the system. Calls which might otherwise be made by duplicating an initiating code are thereby defeated.

Accordingly, it is a principal object of the invention to provide a communications system which employs optical signals between communicating premises.

It is another object of the invention to provide a communications system featuring a videophone located at each communicating premises.

It is a further object of the invention to enable high resolution of video images transmitted by the novel system.

Still another object of the invention is to compensate for limitations on radio frequencies available to widespread communications systems.

An additional object of the invention is to provide a single interface member for connecting components within a premises to the optical cable network.

It is again an object of the invention to process cable television signals through the novel communications system, as well as transmission, receipt, relay of high speed data.

Yet another object of the invention is to employ radio frequency communication as partial links in an optical signal communications system.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
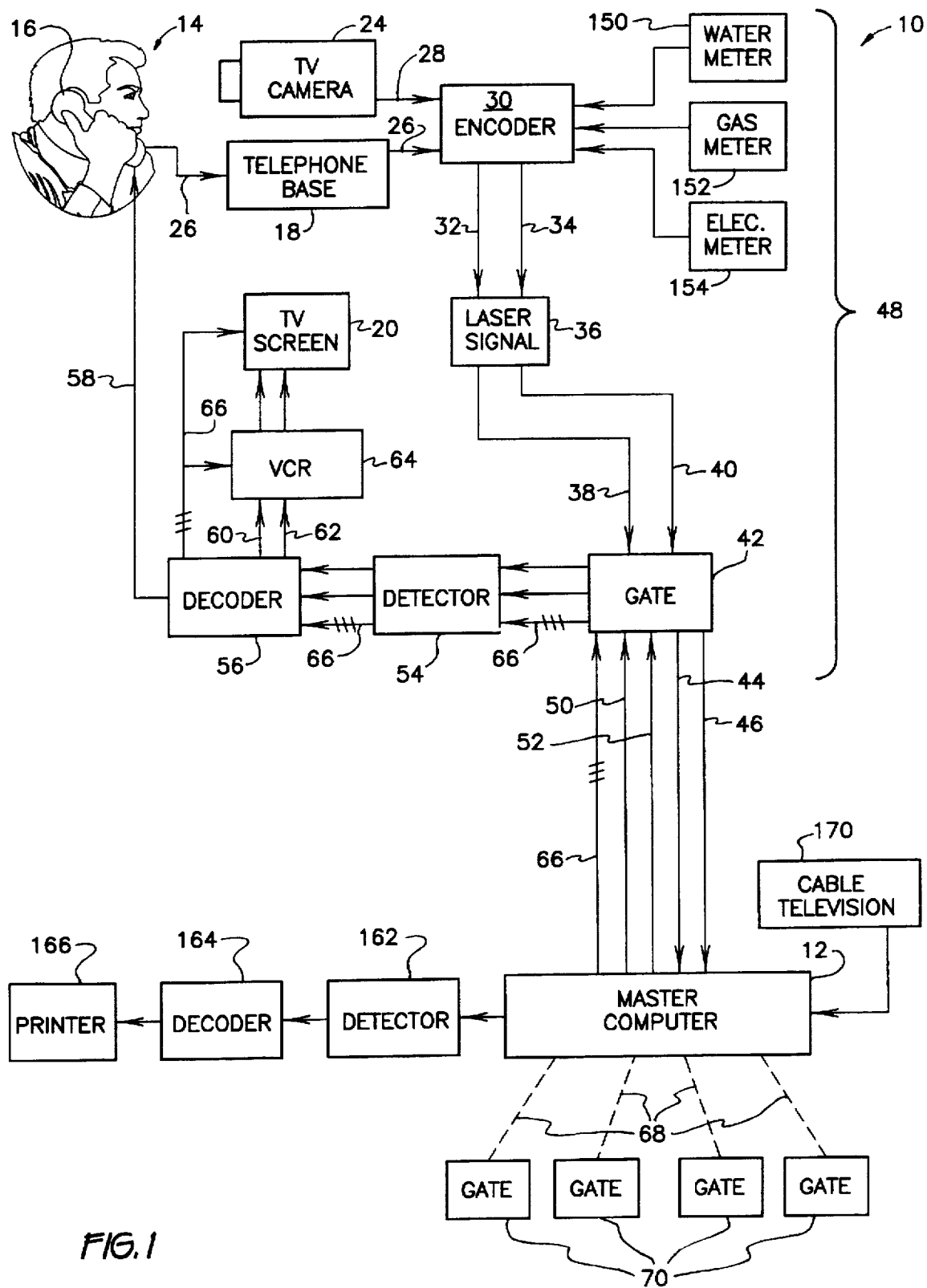
FIG. 1 is a diagrammatic block diagram summarizing the entire novel communications system, and in particular showing principal components located at one representative connected user of the system.

FIG. 1 shows an abbreviated form of the novel communications system 10 which connects many premises (not shown in their entirety) to one another through a centrally located master computer 12. Each premises is served by apparatus enabling bidirectional audible and visual communication between at least two users located remotely from one another. The actual number of connected users preferably encompasses all residential, commercial, and other institutional entities desiring connection to the national telephone grid (not shown).

First looking at apparatus provided for each user at his or her premises, the principal communications components are a telephone 14 including a handset 16 having a microphone and speaker (not separately shown) and a telephone base 18 which cooperate in conventional fashion, a CRT 20 which may either be integral with telephone 14 or which may be the CRT of a conventional free standing television set, and a television camera 24. CRT 20 is conventional, having apparatus for generating a visual image responsive to video signals, horizontal yoke, vertical yoke, and a focus coil (see FIG. 4). Telephone 14 and camera 24 generate in conventional fashion outgoing audio and video signals 26, 28 (respectively) corresponding to sounds detected by the microphone of telephone 14 and visual images detected by television camera 24.

Outgoing audio and video signals are conventional analog signals, which are entered into an encoder 30 for conversion to corresponding digital signals. This may be accomplished by well known apparatus which will not be explained further herein. Encoder 30 is connected to an optical signal generator by audio and video command conductors 32, 34 (respectively).

The optical signal generator is of any type producing a concentrated or amplified light source, and is represented by laser signal generator 36. Digitized signals are transmitted as optical binary signals. Presence and absence of the concentrated light corresponds to presence and absence of voltage in electronic binary signalling systems. Outgoing audio and video signals 38, 40 are conducted to a gate 42 for connection to the external optical cable network. Gate 42 is not necessary in the strictest sense, but provides a single component provided with sufficient ports to enable connection of all incoming and outgoing communications cables. Therefore, actual mechanical connection is expedited and rendered in a standard format at all premises.

Gate 42 is connected to, among other external communicating cables or lines, audio and video output optical cables 44, 46 (respectively). Preferably, cables 44, 46 communicate directly with master computer 12, which will be understood to include, where necessary, conversion apparatus for converting optical signals to usable form.

Returning to components located at and serving the premises of one user, which components will hereinafter be collectively designated a user unit 48, processing of incoming audio and video optical signals is described. Incoming audio and video signals are conducted by optic fiber cables 50, 52 (respectively), both connected to gate 42. Gate 42 connects incoming signals, to an optical signal detector 54 which interprets these signals and subsequently generates corresponding analog signals.

Detector 54 receives incoming optical signals and converts these optical signals into audio signals usable by the speaker of telephone 14 to reproduce transmitted sounds, and into video signals usable by CRT 20 to reproduce transmitted images.

Detector 54 is connected to a decoder 56 which transmits videophone audio signals, indicated by 58, to telephone 14, and transmits both video signals, indicated by 60, and television audio signals, indicated by 62, to a video cassette recorder (VCR) 64, if the premises are so equipped. VCR 64 is, of course, conventionally interconnected to television 20 so that television audio and video signals may be immediately viewed and heard, rather than recorded.

Master computer 12 plays an important role during videophone and television communication, controlling and coordinating bidirectional audible and visual communication established between any two users. Computer 12 generates control signals causing appropriate voltages to bear on horizontal and vertical aspects of the picture tube yoke. Computer 12 also generates control signals controlling the electron beam gun or guns. Both communicating parties are synchronized and managed appropriately by computer 12. The control signals associated with horizontal and vertical control and electron gun control are represented at communication cables 66. Of course, signals carried on cables 66 will change form from optical digital in nature to analog signals, and are transmitted to VCR 64 and television 20. This is accomplished by detector 54 and decoder 56.

Master computer 12 is connected or linked to each unit user 48 by a network of optical fiber cables. This network includes cables 44, 46, 50, 52, and 66 for user unit 48, and corresponding groups of cables serving each other user unit. These corresponding groups are indicated at 68 and link each additional user unit, represented in FIG. 1 by gates 70, to master computer 12.

Figure 2:
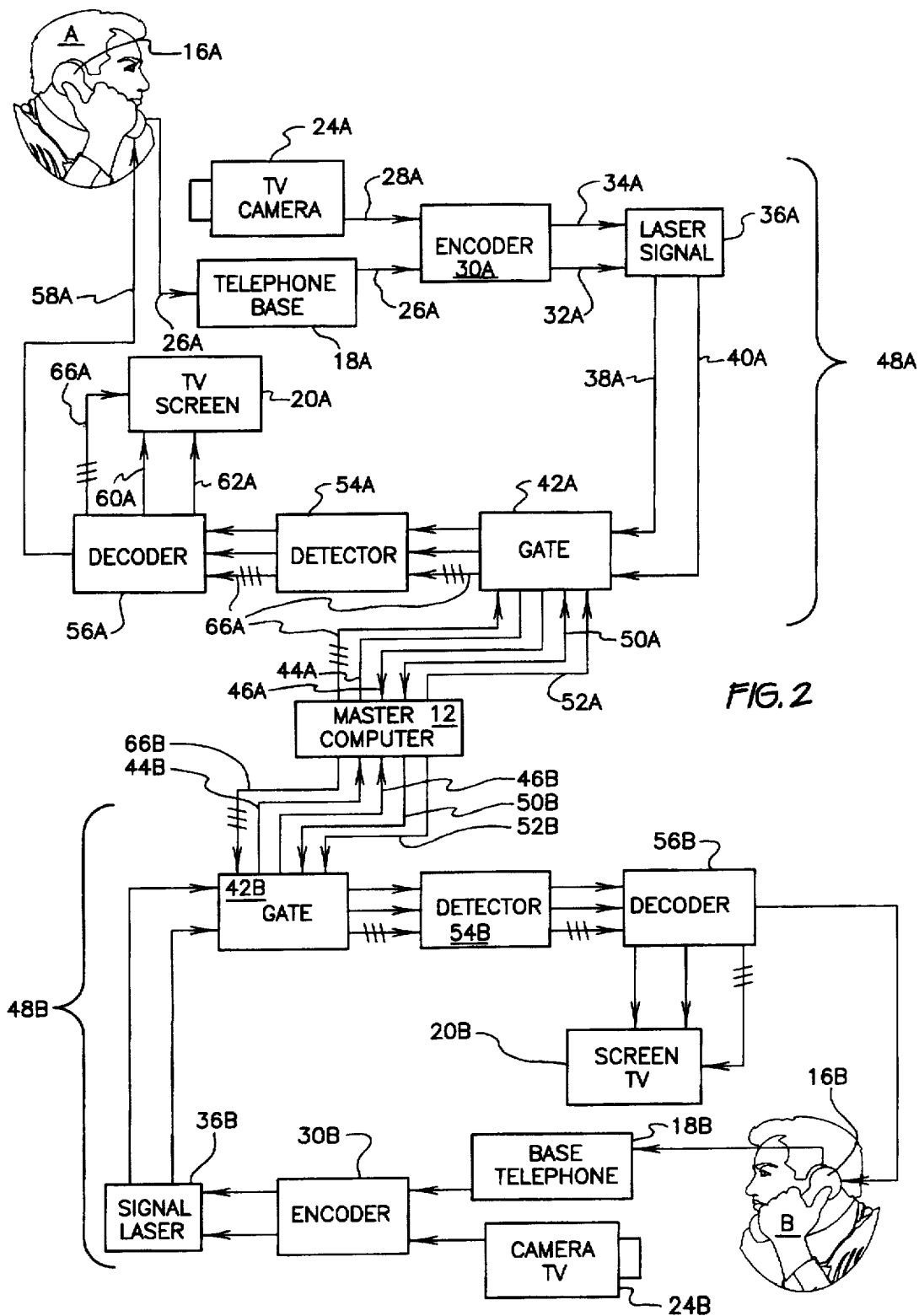
FIG. 2 is a diagrammatic block diagram illustrating connection of and communication by two users connected to the novel system.

Each additional user unit includes at a minimum components shown in FIG. 2, where two users A, B are seen communicating to one another by videophone. The principal components of each user units 48A, 48B are similar to those of FIG. 1. The numeric portion of each reference numeral in FIG. 2 indicates identity with respect to a similar component depicted in FIG. 1, and the alphabetical portion of each reference numeral in FIG. 2 indicates with which user A or B the respective component is associated.

Figure 3:
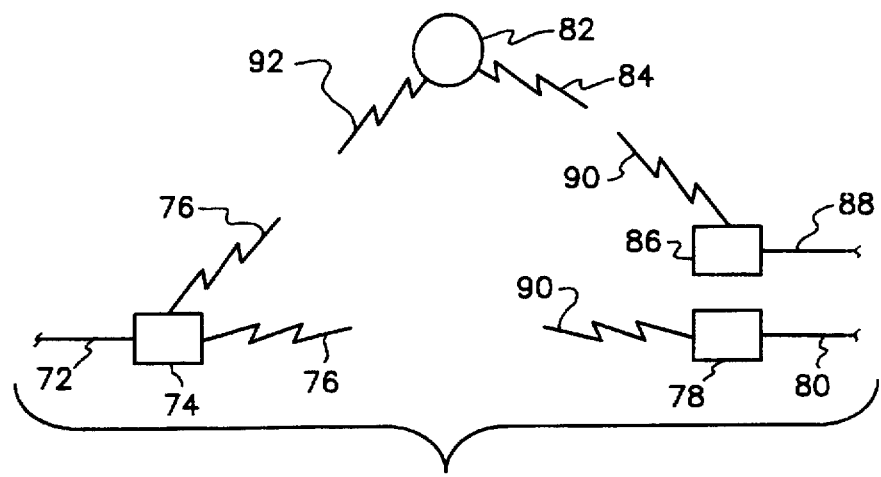
FIG. 3 is a partial diagrammatic representation of radio communication links disposed within an optical signal network.

It is generally intended to communicate by optical signals transmitted through optical cables. However, there will be distances over which placement of optical cables is not feasible. Referring now to FIG. 3, communications are made continuous in such instances by radio frequency links disposed serially within the optical network. An optical cable or cables, represented by 72, is connected to a radio transmitter 74 including signal conversion apparatus (not separately shown) for converting optical signals to corresponding radio frequency signals represented by 76. Signals 76 are received by a radio receiver 78 having signal conversion apparatus (not separately shown) for converting signals 76 to corresponding optical digital signals. Optical digital signals are then connected to optical cables 80 and transmitted over optical cables 80 to their destinations.

In some cases, radio links may be partially conducted by a satellite 82. In this case, RF/digital signals 76 are continued by satellite 82, as indicated at 84. Signals 84 are received by a suitable receiver 86 and converted to optical signals in similar fashion to that employed by receiver 78. Receiver 86 is connected to optical cables 88 and optical signals are transmitted to their destinations.

Preferably, radio receivers 78 and 86 also include transmitters (not separately shown), so that bidirectional communication may proceed employing associated components. Signals transmitted oppositely signals 76 and 84 are indicated respectively at 90 and 92. Of course, radio transmitter 74 includes a receiver (not separately shown) enabling reception of signals 90 and 92.

Figure 4:
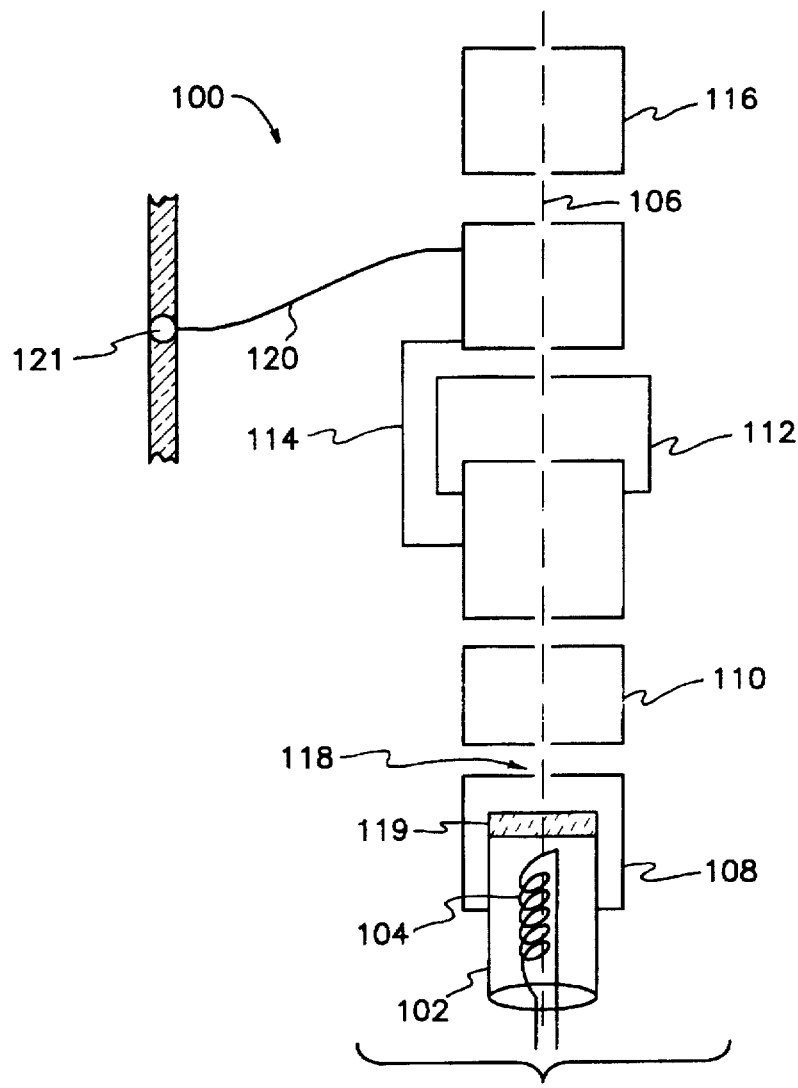
FIG. 4 is a diagrammatic representation of components of a cathode ray tube modified according to the present invention.

High definition visual resolution is made possible in CRT 20 (see FIG. 1) due to control by master computer 12, and also due to construction of each electron gun of all CRTs 20 disposed throughout communications system 10. As shown in FIG. 4, electron guns 100 are generally of conventional construction, having a filament 104 inside a cathode cylinder 102 topped by a cathode coating 119 for providing a continuous source of electrons through an extremely fine aperture 118 in G1 108 which extremely limits the diameter of the electron beam stream 106 while the G1 108 controls the density or lack thereof of the generated electrons passing through said G1 aperture into the accelerating control of G2 110 thru apertures in the first part of split anode 114 passing through and being focused to an extremely fine-pointed stream of electrons by focus coil 112 and thereby continuing the acceleration of said focused electron stream by the second half of the split anode 114, by an extremely high voltage (15,000 volts to 25,000 volts) received from spiders 120 from a contact 121 in the CRT envelope, which contact has both internal and external power supply (not shown) through the high voltage contact and thus to the upper half of the split anode 114. The accelerated focused stream of the electrons then enters the purview of the yoke 116 which directs the electron stream into the screen of the CRT (not shown) so that said stream by being directed from left to right and from top of the screen down, all the while the density of said electron stream is being increased or decreased, so as to make the phosphor glow brightly, less brightly, not at all, thereby drawing a video picture on the screen (not shown), one dot at a time.

Aperture 118 has a diameter of maximal dimension of 0.010 inch. Of course, second grid 110 also has an aperture 120, which is conventional in its construction.

Master computer 12 (see FIG. 1) takes advantage of the dimension of aperture 118 to cause electron gun 100 to scan at least two thousand lines. This is brought about by appropriate control signals generated by computer 12 and carried on cables 66 as described hereinbefore. The videophone created by the combination of telephone 14 (see FIG. 1), CRT 20 (see FIG. 1), and camera 24 (see FIG. 1) thus enjoys extremely high definition resolution previously not available in proposed videophones.

Returning to FIG. 1, additional uses and features of communications system 10 will be described. One example is set forth wherein data originating at the user premises is output to computer 12. Illustratively, reading and monitoring of consumed utilities may be connected to the novel system. Each utility meter, such as water meter 150, gas meter 152, and electric meter 154 is of a type producing an analog output signal. These analog output signals are conducted by cables 156, 158, 160 to encoder 30. Encoder 30 and optical signal generator 36 then convert the analog signals to optical signals, which are in turn transmitted back to computer 12.

Computer 12 may utilize this data to generate data for printed billing statements (not shown). Computer 12 generates data in the form of optical signals which are transmitted to a billing site which may be either local to or remote from computer 12. If remote, detector 162 and decoder 164 convert the optical signals to analog signals which are usable to drive a conventional printer 166. Alarm conditions, such as inordinate rate of utility usage, or unauthorized usage, may be inferred by consumption data, and may be employed to trigger a written notice or even direct investigation by a party (not shown) authorized to respond to such an alarm.

A second additional use is described wherein external data is employed to provide additional communication services at the user premises. Illustratively, cable television service, shown representatively at 170, provides an input to computer 12. Computer 12 may be employed to monitor which users are authorized to receive cable television service. Upon determining authorized users, audio, video, and appropriate control signals are transmitted to each user unit.

Security may be imparted to the novel system in the following manner. Each gate 42 is provided with signalling apparatus encoding every data transmission with a unique identifying code associated with the location of its associated user unit. Only a gate installed at the user unit is capable of generating the code. Computer 12 enables completion of communication to the initiating user unit only upon recognition of this code after comparing the code to predetermined data recorded in computer memory (not separately shown) corresponding to codes for all users.

The novel communications system as described is susceptible to many modifications and variations. Illustratively, the number of individual optical cables may vary due to multiplexing in any suitable way to employ one cable for more than one type of signal. In another example, CRT 20 may be of the color type, having three electron guns 100 each having a dedicated input signal and dedicated control signals.

Many other features, advantages, usages, and variations including, but not limited to high speed data transmission may be introduced by those of skill in the art. It is to be understood that the present invention is not limited to the embodiments described above, but encompasses any and all embodiments within the scope of the following claims.

I claim:

1. A communications system enabling bidirectional audible and visual communication between at least two remotely located users, said communications system comprising:

a plurality of user units, one said user unit serving the premises of one user;

a central computer for controlling and coordinating bidirectional audible and visual communication established between any two users, having means for generating horizontal yoke control signals and transmitting said horizontal yoke control signals to each user unit, means for generating vertical yoke control signals and transmitting said horizontal yoke control signals to each user unit, and focus coil means control signals and transmitting said focus coil means control signals to each user unit; and a network of optical fiber cables linking each said user unit to said central computer, each user unit further comprising a telephone having a microphone, a speaker, and means for generating first analog signals corresponding to sounds detected by said microphone, a television camera having means for generating second analog signals corresponding to visual images detected by said television camera, a cathode ray tube having means for generating a visual image responsive to video signals, horizontal yoke, vertical yoke, and focus coil means, an encoder connected to said telephone and to said television camera, having means for converting said first analog signals and said second analog signals into corresponding first digital audio signals and second digital video signals, an optical signal generator connected to said encoder, having means for generating optical signals corresponding to said first digital signals and said second digital signals, said optical signal generator operably connected to said network of optical fiber cables, an optical signal detector and decoder having means for receiving incoming optical signals and converting said incoming optical signals into audio signals usable by said speaker of said telephone to reproduce transmitted sounds and video signals usable by said cathode ray tube to reproduce transmitted images, said detector and decoder also having means for connecting said optical signals and said audio signals to said telephone and to said cathode ray tube, and means for connecting said horizontal yoke control signals, said vertical yoke control signals, and said focus coil means control signals to said cathode ray tube.

2. The communications system according to claim 1, said detector and decoder of each said user unit further comprising means for receiving digital signals from an associated said detector and for converting said digital signals into corresponding analog signals, and for transmitting said analog signals to said cathode ray tube and to said speaker of said telephone.

3. The communications system according to claim 1, each said cathode ray tube having an electron beam gun having a G1 aperture having a maximal diameter dimension of 0.010 inch, whereby said communications systems provides high definition visual resolution.

4. The communications system according to claim 3, said cathode ray tube further having means for scanning at least two thousand lines.

5. The communications system according to claim 1, further comprising means for connecting a utility meter to said encoder of a said user unit, whereby consumption of the connected utility may be communicated to said master computer and thereby monitored by said communications system.

6. The communications system according to claim 5, each said user unit further comprising a gate having ports enabling connection of optical cables also connected to said optical signal generator and said detector, whereby ready connection of optical fiber cables of said network of optical fiber cables to each said user unit is enabled.

7. The communications system according to claim 1, said user unit further comprising means for receiving cable television signals and for transmitting cable television signals to said cathode ray tube.

8. The communications system according to claim 1, further comprising means for providing each said user unit with a unique identifying code associated with the location of each respective user unit, and for enabling audio and video communication to be completed only when a said unique identifying code is signalled to said master computer from the location corresponding to the said user unit initiating communication.

9. The communications system according to claim 1, said network of optical fiber cables having radio communication links disposed serially therein, each said radio communication link including:

a first converter having means for converting optical signals to corresponding radio frequency signals, said first converter operably connected to one said optical fiber cable;

a radio transmitter operably connected to said first converter, for transmitting radio frequency signals converted from optical signals;

a radio receiver for receiving radio frequency signals converted from optical signals; and a second converter having means for converting radio frequency signals to corresponding optical signals, said second converter operably connected to another said optical fiber cable, whereby optical signals are partially transmitted by radio frequency.

10. A communications system enabling bidirectional audible and visual communication between at least two remotely located users, said communications system comprising:

a plurality of user units, one said user unit serving the premises of one user;

a central computer for controlling and coordinating bidirectional audible and visual communication established between any two users, having means for generating horizontal yoke control signals and transmitting said horizontal yoke control signals to each user unit, means for generating vertical yoke control signals and transmitting said horizontal yoke control signals to each user unit, and focus coil means control signals and transmitting said focus coil means control signals to each user unit, and means for providing each said user unit with a unique identifying code associated with the location of each respective user unit, and for enabling audio and video communication to be completed only when a said unique identifying code is signalled to said master computer from the location corresponding to the said user unit initiating communication; and a network of optical fiber cables linking each said user unit to said central computer, each user unit further comprising a telephone having a microphone, a audio receiving speaker, and means for generating first analog signals corresponding to sounds detected by said microphone, a television camera having means for generating second analog signals corresponding to visual images detected by said television camera, a cathode ray tube having means for generating a visual image responsive to video signals, horizontal yoke, vertical yoke, and focus coil means, said cathode ray tube having an electron beam gun having a G1 aperture having a maximal diameter dimension of 0.010 inch, said cathode ray tube further having means for scanning at least two thousand lines, whereby said communications systems provides high definition visual resolution, an encoder connected to said telephone and to said television camera, having means for converting said first analog signals and said second analog signals into corresponding first digital audio signals and second digital video signals, an optical signal generator connected to said encoder, having means for generating optical signals corresponding to said first digital signals and said second digital signals, said optical signal generator operably connected to said network of optical fiber cables, an optical signal detector and decoder having means for receiving incoming optical signals and converting said incoming optical signals into audio signals usable by said speaker of said telephone to reproduce transmitted sounds and video signals usable by said cathode ray tube to reproduce transmitted images, said detector and decoder also having means for connecting said optical signals and said audio signals to said telephone and to said cathode ray tube, and means for connecting said horizontal yoke control signals, said vertical yoke control signals, and said focus coil means control signals to said cathode ray tube, said detector and decoder of each said user unit further comprising means for receiving digital signals from an associated said detector and for converting said digital signals into corresponding analog signals, and for transmitting said analog signals to said cathode ray tube and to said speaker of said telephone, a gate having ports enabling connection of optical cables also connected to said optical signal generator and said detector, whereby ready connection of optical fiber cables of said network of optical fiber cables to each said user unit is enabled, means for receiving cable television signals and for transmitting cable television signals to said cathode ray tube, and means for connecting a utility meter to said encoder of a said user unit, whereby consumption of the connected utility may be communicated to said master computer and thereby monitored by said communications system.

11. The communications system according to claim 10, said network of optical fiber cables having radio communication links disposed serially therein, each said radio communication link including:

a first converter having means for converting optical signals to corresponding radio frequency signals, said first converter operably connected to one said optical fiber cable;

a radio transmitter operably connected to said first converter, for transmitting radio frequency signals converted from optical signals;

a radio receiver for receiving radio frequency signals converted from optical signals; and a second converter having means for converting radio frequency signals to corresponding optical signals, said second converter operably connected to another said optical fiber cable, whereby optical signals are partially transmitted by radio frequency.

* * * * *

UNITED STATES PATENT AND TRADEMARK OFFICE
CERTIFICATE OF CORRECTION

PATENT NO. : 5,703,636
DATED : December 30, 1997
INVENTOR(S) : Carmine Cifaldi

It is certified that error appears in the above-identified patent and that said Letters Patent is hereby corrected as shown below:

Claim 1, line 13, change "horizontal" to --vertical--.

Claim 10, line 13, change "horizontal" to --vertical--.

Signed and Sealed this

Fourth Day of May, 1999

Attest:

Q. TODD DICKINSON

*Attesting Officer*                *Acting Commissioner of Patents and Trademarks*